(12) United States Patent
Thompson (10) Patent No.: US 8,527,612 B2
(45) Date of Patent: Sep. 3, 2013

(54) METHODS, DEVICES AND COMPUTER PROGRAM PRODUCTS FOR CONFIGURING NETWORK-ENABLED DEVICES

(75) Inventor: James Gordon Thompson, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 199 days.

(21) Appl. No.: 12/262,449

(22) Filed: Oct. 31, 2008

(65) Prior Publication Data

US 2010/0115065 A1    May 6, 2010

(51) Int. Cl.
*G06F 15/177* (2006.01)

(52) U.S. Cl.
USPC .......................... 709/220; 709/204; 709/224

(58) Field of Classification Search
USPC ................. 709/216, 217, 219, 220, 221, 222, 709/224, 227, 229
See application file for complete search history.

(56) References Cited

U.S. PATENT DOCUMENTS

| | | | |
|---|---|---|---|
| 7,254,610 B1 * | 8/2007 | Turner et al. ................. | 709/204 |
| 7,826,408 B1 * | 11/2010 | Vleugels et al. ............. | 370/328 |
| 7,907,050 B1 * | 3/2011 | Callaghan .................... | 340/538 |
| 2003/0033548 A1 * | 2/2003 | Kuiawa et al. ............... | 713/300 |
| 2004/0064276 A1 * | 4/2004 | Villicana et al. ............. | 702/61 |
| 2006/0116794 A1 * | 6/2006 | Stoupis et al. ............... | 700/286 |
| 2006/0183490 A1 * | 8/2006 | Madhavan et al. ........... | 455/501 |
| 2009/0106414 A1 * | 4/2009 | Stavenow et al. ............ | 709/224 |

FOREIGN PATENT DOCUMENTS

JP    2007265308    * 10/2007

OTHER PUBLICATIONS

Murty Yalla, Mark Adamiak, "Application of Peer to Peer Communication for Protective Relaying", Apr. 2002, IEEE Transactions on Power Delivery, vol. 17, No. 2, pp. 446-451.*

"E-Mon Rolls with Wireless Automatic Meter Reading System", Nov. 8, 2006, Wireless News, E-Mon Corp.*

* cited by examiner

*Primary Examiner* — Barbara Burgess
(74) *Attorney, Agent, or Firm* — Myers Bigel Sibley & Sajovec PA (57) ABSTRACT

Methods, devices and computer program products are provided for configuring network-enabled devices. One or more additional network-enabled devices containing configuration parameters relevant to a first network-enabled device are discovered. The relevant configuration parameters are obtained from the one or more additional network-enabled device by the first network-enabled device and the first network-enabled device is configured using the obtained configuration parameters.

25 Claims, 5 Drawing Sheets

METHODS, DEVICES AND COMPUTER PROGRAM PRODUCTS FOR CONFIGURING NETWORK-ENABLED DEVICES

BACKGROUND OF THE INVENTION

The present invention relates generally to network-enabled devices, and more particularly, configuration of network-enabled devices.

Devices, such as uninterruptable power supplies (UPSs), meters, trip units or breakers, are typically configured using a front panel of the device, if the device has a front panel, or by a software configuration package. Configuring a device via the front panel may be problematic when the number of devices in a location becomes excessive, for example, as few as 10 devices. Typically there is no other way to configure the device if the device has no built-in communications. Some devices may be configured using a software package or via the web, which may only be applicable to the firmware update portion of device configuration.

Having devices use the Internet for automatic updates may be problematic in that many local networks do not have access to the Internet and, therefore, cannot determine if their configuration, firmware flash or device repertoire, or other configuration data, is out of date. Furthermore, configuring devices using the Internet may also be limited to "updates" and not standardized configuration needs of the customer.

Software has also been a typical solution, but this may be problematic for several reasons as well. For example, keeping the software up-to-date with how to flash multiple devices and teaching it how to configure each device adds significant time to the development cycle of the software and typically requires continual updating of the software for newly introduced devices in the field. A change in the device's firmware to add configuration parameters typically requires corresponding changes in the software creating a lag, and frustration on the part of the customer.

SUMMARY OF EMBODIMENTS OF THE INVENTION

Some embodiments of the present invention provide methods, devices and computer program products for configuring network-enabled devices. One or more additional network-enabled devices containing configuration parameters relevant to a first network-enabled device are discovered. The relevant configuration parameters are obtained from the one or more additional network-enabled device by the first network-enabled device and the first network-enabled device is configured using the obtained configuration parameters.

In further embodiments of the present invention, the relevant configuration parameters may be requested from the at least one additional network-enabled device and the requested configuration parameters may be received at the first network device. The requested configuration parameters may be provided as an extended Markup Language (XML) formatted file including the relevant configuration parameters. In some embodiments, a rejection of the request for configuration parameters may be received at the first network-enabled device from one or more additional network-enabled devices.

In still further embodiments, the first network-enabled device and the one or more additional network-enabled devices may be peer devices.

In some embodiments of the present invention, configuring the first network-enabled device may include updating the configuration parameters at the first network-enabled device based on the configuration parameters obtained from the at least one additional network-enabled device.

In further embodiments of the present invention, the first network-enabled device may be a newly added network-enabled device and the one or more additional network-enabled devices may be one or more existing network-enabled devices.

In still further embodiments of the present invention, the first network-enabled device may be an existing network-enabled device and the one or more additional network-enabled devices may one or more newly added network-enabled devices.

In some embodiments of the present invention, the network-enabled device may be an uninterruptible power supply (UPS), an electricity meter, a feeder protector, a software program, or any network-enabled device.

DETAILED DESCRIPTION OF EMBODIMENTS OF THE INVENTION

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the teen "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

Unless otherwise defined, all taints (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As will be appreciated by one of skill in the art, the invention may be embodied as a method, device, or computer program product. Accordingly, the present invention may take the form of an entirely hardware embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The invention is described in part below with reference to a flowchart illustration and/or block diagrams of methods, devices and computer program products according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

As discussed above, configuration and updating of network devices can be time consuming. Thus, according to some embodiments of the present invention, methods, devices and computer program products are provided that place the onus of the device configuration setting onto the device itself (or its proxy). In particular, since individual devices know how they are configured and what they can be configured for, i.e., the firmware engineer/designer knows which parameters need to be set, according to some embodiments of the present invention devices, the entities that best know how to configure themselves, are used to configure like-type devices. It will be understood that devices do not have to be of "like-type" if the device performing the configuration has access to the device configuration parameters of the device being configured.

In other words, with the introduction of networked devices, for example, Power Xpert Architecture from Eaton Corporation of Cleveland, Ohio, devices according to some embodiments of the present invention can use a peer-to-peer mechanism for configuring and updating themselves in viral form if deemed acceptable by the customer/security/permissions settings. In some embodiments of the present invention, Gateways can act as proxies for this function.

Some embodiments of the present invention will now be described with respect to FIGS. 1 through 5. As discussed herein, some embodiments of the present invention provide methods, devices and computer program products for configuring network-enabled devices. In particular, a first network-enabled device may be configured to discover at least one additional device and obtain configuration parameters relevant to the first network-enabled device from the at least one additional network-enabled device. As used herein, "configuration parameters" refer to details of how to configure a particular device. In particular, "configuration parameters" may not only imply the concept that both new and old devices can exchange configuration details, but may also exchange entire firmware. The first network-enabled device may be configured/updated using the configuration parameters obtained from the at least one additional network-enabled device. Accordingly, development time may become very efficient using devices, methods and computer program products in accordance with some embodiments of the present invention, as will be discussed further below with respect to FIGS. 1 through 5.

Figure 1:
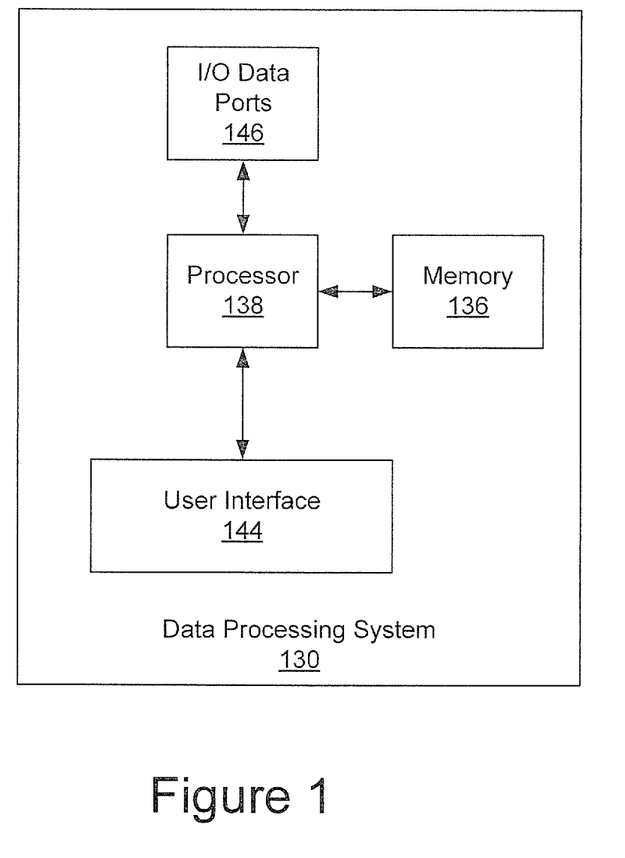
FIG. 1 is a block diagram of a data processing system suitable for use in some embodiments of the present invention.

Referring first to FIG. 1, an exemplary embodiment of a data processing system 130 configured in accordance with embodiments of the present invention will be discussed. The data processing system 130, which may be incorporated in a network-enabled device, such as a personal computer, server, power supply, an uninterruptible power supply (UPS) or the like, may include a user interface 144, for example, input or output device(s), such as a keyboard or keypad, a display, a speaker and/or microphone, and a memory 136 that communicate with a processor 138. The data processing system 130 may further include an I/O data port(s) 146 that also communicates with the processor 138. The I/0 data ports 146 can be used to transfer information between the data processing system 130 and another computer system or a network using an Internet protocol (IP) connection. These components may be conventional components such as those used in many conventional data processing systems, which may be configured to operate as described herein.

Figure 2:
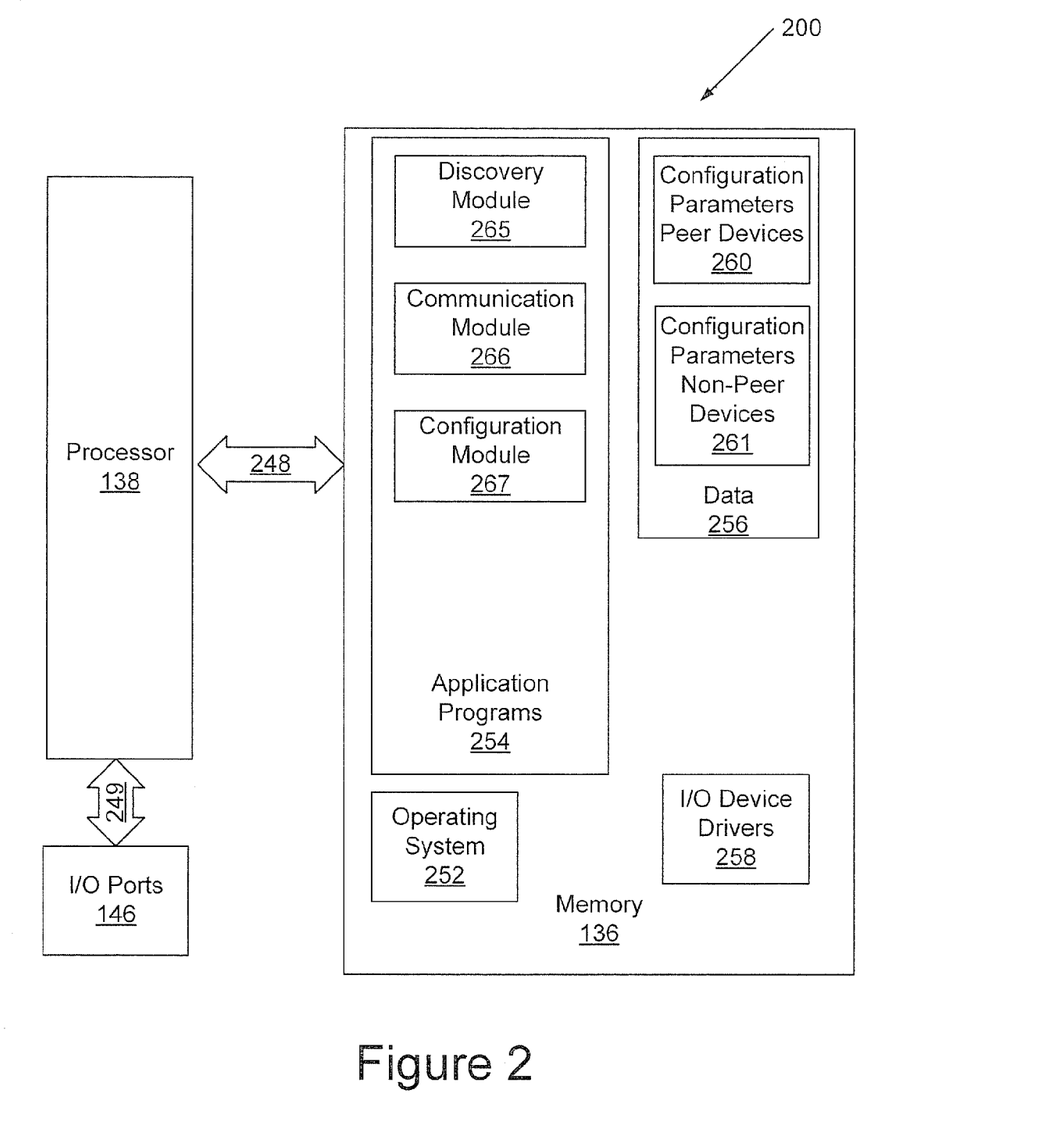
FIG. 2 is a block diagram of a system including a network-enabled device according to further embodiments of the present invention.

Referring now to FIG. 2, a more detailed block diagram of data processing system 200 of FIG. 1 according to some embodiments of the present invention will be discussed. The data processing system 200 of FIG. 2 may be included in any network-enabled device in accordance with some embodiments of the present invention. As used herein, "network-enabled device" refers to a UPS, an electricity meter, a feeder protector, a software program, or any network-enabled device capable of operating in accordance with some embodiments of the present invention. Referring again to FIG. 2, the processor 138 communicates with the memory 136 via an address/data bus 248. The processor 138 can be any commercially available or custom microprocessor, microcontroller, digital signal processor or the like. The memory 136 may include any memory devices containing the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 2, the memory 136 may include several categories of software and data used in the status information module 268: an operating system or kernel 252; application programs 254; input/output (I/O) device drivers 258; and data 256. As will be appreciated by those of skill in the art, the operating system 252 may be any operating system suitable for use with a data processing system or embedded device, such as OS/2, AIX or zOS from International Business Machines Corporation, Armonk, N.Y., Windows95, Windows98, Windows2000 or WindowsXP from Microsoft Corporation, Redmond, Wash., Unix, Linux, embedded Linux, embedded XP, QNX or VxWorks. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 200 and preferably include at least one application that supports operations according to some embodiments of the present invention. Finally, the data 256 represents the static and dynamic data used by the application programs 254, the operating system 252, the I/O device drivers 258, and other software programs that may reside in the memory 136.

As illustrated in FIG. 2, the data 256 includes configuration parameters for peer devices 260 and configuration parameters for non-peer devices 261 according to some embodiments of the present invention. As discussed above, configuration parameters include not only information that can be used to configure or update a device, but may also include entire firmware. It will be understood that although only two configuration parameter files 260 and 261 are illustrated in FIG. 2, embodiments of the present invention are not limited to this configuration. For example, one or more than two configuration parameter files may be present without departing from the scope of the present invention.

As further illustrated in FIG. 2, according to some embodiments of the present invention the application programs 254 include a discovery module 265, a communication module 266 and a configuration module 267. While the present invention is illustrated with reference to the discovery module 265, the communication module 266 and the configuration module 267 being application programs in FIG. 2, as will be appreciated by those of skill in the art, other configurations fall within the scope of the present invention. For example, rather than being application programs the discovery module 265, the communication module 266 and the configuration module 267 may also be incorporated into the operating system 252 or other such logical division of the data processing system 130. Furthermore, while the discovery module 265, the communication module 266 and/or the configuration module 267 are illustrated in a single data processing system, as will be appreciated by those of skill in the art, such functionality may be distributed across one or more data processing systems. Thus, the present invention should not be construed as limited to the configuration illustrated in FIGS. 1 and 2, but may be provided by other arrangements and/or divisions of function between data processing systems.

Referring again to FIG. 2, in some embodiments of the present invention, the discovery module 265 may be configured to discover, from a first network-enabled device, at least one additional network-enabled device containing configuration parameters relevant to the network-enabled device. As discussed above, in some embodiments of the present invention, the ability to discover other devices may be provided in the Power Xpert Architecture. Alternatively, discovery can be accomplished by another method, for example, by the Power Xpert Software as a general inquiry without departing from the scope of the present invention. In some embodiments of the present invention, the first network-enabled and the at least one additional network-enabled device may be peer devices. However, embodiments of the present invention are not limited to this configuration. For example, if a standardized "file" and protocol exchange format were established, devices of one type could also act as proxies for devices of another type without departing from the scope of the present invention. For example, there is nothing restricting the UPS, if it knows about a meter that is out of date from a configuration perspective, from accepting an update for the meter and pass it on.

The communication module 266 may be configured to obtain, at the first network-enabled device, the relevant configuration parameters from the at least one additional network-enabled device. In particular, the communication module 266 may be configured to request the relevant configuration parameters from the at least one additional network-enabled device and receive the requested configuration parameters at the network-enabled device. In some embodiments of the present invention, the communication module 266 is configured to receive the configuration parameters as an extended Markup Language (XML) formatted file including the relevant configuration parameters. It will be understood that embodiments of the present invention are not limited to receiving the configuration information as XML formatted files, any format may be used without departing from the scope of the present invention.

The configuration module 267 may be configured to configure the network-enabled device using the obtained configuration parameters. It will be understood that the obtained configuration parameters may be used to both fully configure or update the configuration information associated with the network-enabled device without departing from the scope of the present invention. Furthermore, the configuration parameters may include entire device firmware without departing from the scope of the present invention.

It will be understood that the first network-enabled device configured to discover at least one additional network-enabled device can be an existing network-enabled device or a newly added network-enabled device without departing from the scope of the present invention. If the first network-enabled device is an existing network-enabled device, the at least one additional network-enabled device may provide configuration updates to the first network-enabled device. If, on the other hand, the first network-enabled device is a newly added network-enabled device, the newly added network-enabled device may receive all of the configuration parameters/firmware from the at least one additional network-enabled device. In some embodiments, existing network-enabled devices may be configured to discover newly added network-enabled devices as the newly added network-enabled devices may have access to the most up to date configuration information.

It will be understood that whether the device discovering the other devices is a newly added device or an existing device does not determine which device receives the configuration parameters. In other words, the discovering device may receive configuration information, provide configuration information or both. Similar, the discovered device or devices may receive configuration information, provide configuration information or both without departing from the scope of the present invention.

It will be further understood that the data processing system 200 of FIG. 2 may be included in both the network-enabled devices discovering other devices and network-enabled devices providing configuration information. It will be further understood that the more than one device may provide configuration parameters responsive to the request. As discussed above, devices according to some embodiments of the present invention may be, for example, uninterruptible power supplies (UPSs), electricity meters, software program, feeder protectors, network attached storage or any network-enabled device without departing from the scope of the present invention.

Figure 3:
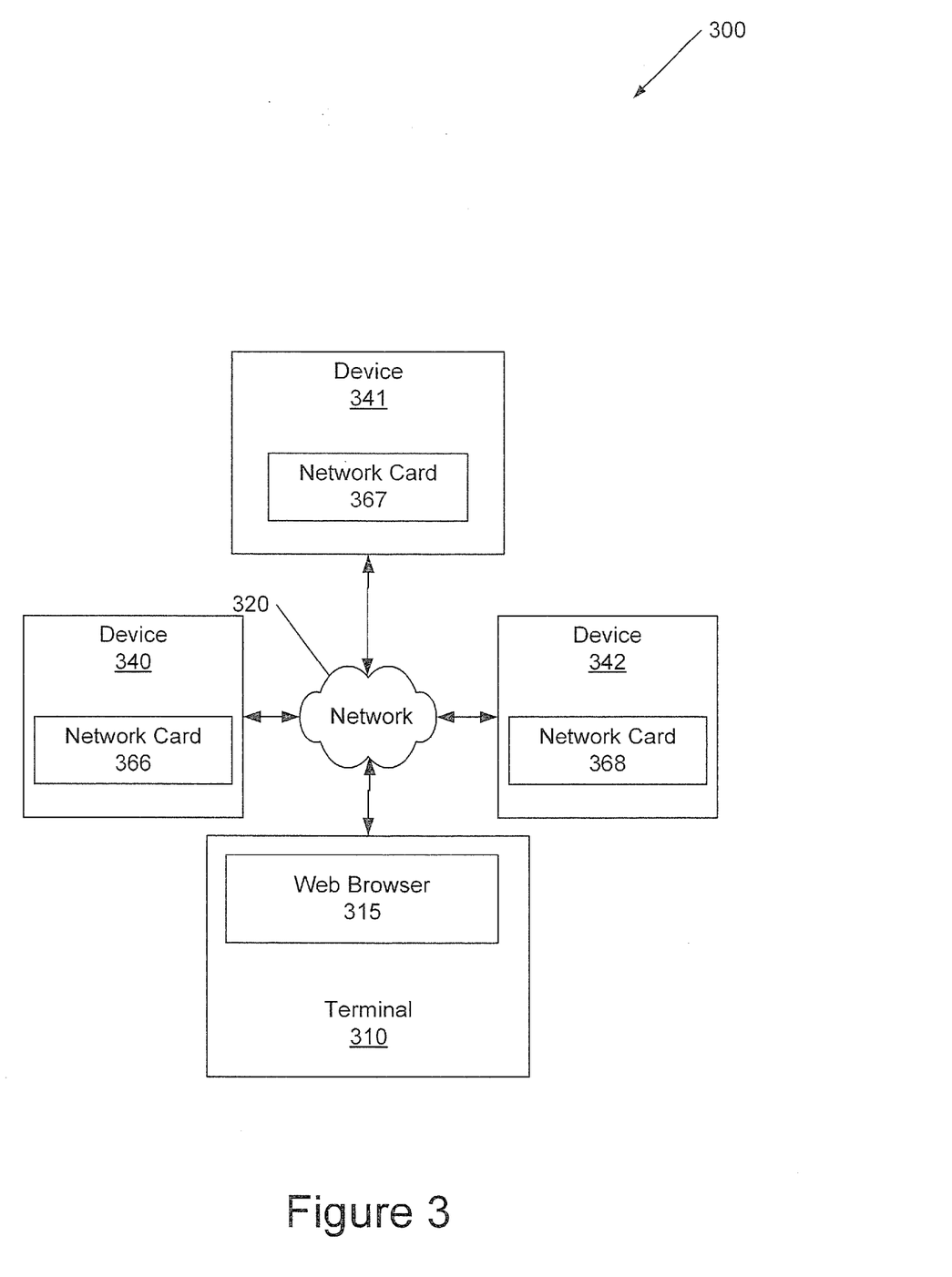
FIG. 3 is a block diagram illustrating still further embodiments of the present invention in an exemplary network environment.

FIG. 3 illustrates a network environment 300 according to some embodiments of the present invention. As illustrated in FIG. 3, the network environment 300 may include a terminal 310, a network 320, one or more network-enabled devices 340, 341 and 342, for example, uninterruptible power supplies (UPSs), switches, routers, meters and the like. The terminal 310 may be, for example, a laptop computer, a desktop computer, a personal data assistant (PDA), a web capable mobile terminal or any device capable of communicating with the network 320. As illustrated, the terminal 310 may be configured to run a web browser 315, which may be used by, for example, a system administrator to monitor remote devices 340, 341 and 342. The terminal 310 may communicate over the network 320, for example, the internet, through a telephone line, a digital subscriber link (DSL), a broadband cable link, a wireless link or the like, with the one or more network-enabled devices 340, 341 and 342.

As further illustrated, the network-enabled devices 340, 341 and 342 may include network cards 366, 367 and 368 that communicate with the network 320. In some embodiments of the present invention, the network cards 366, 367 and 368 may be ConnectUPS Web/SNMP Card offered by Eaton Power Quality Corporation, the assignee of the present application. The ConnectUPS Web/SNMP Card is configured to install in a device to provide simple network management protocol (SNMP), hypertext transfer protocol (HTTP), simple mail transfer protocol (SMTP), wireless application protocol (WAP) and Telnet compatibility and advanced RS-232 communications. The network card may allow monitoring and management of devices, for example, servers, routers, hubs, UPSs and other key inter-networking devices. ConnectUPS Web/SNMP cards provide a link between the device and, for example, the Ethernet local area/wide area network (LAN/WAN), allowing the device to be remotely monitored and controlled.

Exemplary operations according to some embodiments of the present invention will now be discussed with respect to FIGS. 2 and 3. The discovery module 266 of a first network-enabled device 340, for example, a meter on a communications network 320, such as a local area network (LAN), may discover at least one additional network-enabled device 341, 342 on the communications network 320. The communication module 266 of the first network-enabled device 340 may request relevant configuration parameters from the at least one additional network-enabled device 341, 342 and receive the requested configuration parameters at the first network device. In some embodiments of the present invention, the configuration parameters may be received as an XML formatted file including the relevant configuration parameters. It will be understood that the at least one additional device 341, 342 does not have to provide the configuration parameters responsive to the request and may send a rejection of the request for configuration parameters to the first network-enabled device 340 from at least one of the at least one additional network-enabled device 341, 342.

In particular, network-enabled devices in accordance with some embodiments of the present invention can optionally perform peer-to-peer synchronization of any other network-enabled device. Once configured, the newly configured network-enabled device can then provide the configuration parameters to other devices or perform configuration through a Gateway proxy. Any network-enabled device of like type can accept or reject an attempt from a peer to establish a like configuration as discussed above. As further discussed above, the configuration parameters transferred between network-enabled devices can be used to update devices, for example, firmware updates, in addition to configuration of the device.

The configuration module 267 of the first network-enabled device 340 may be configured to configure and/or update the first network-enabled device 340 based on the configuration parameters received from the at least one additional network-enabled device 341, 342.

Thus, according to some embodiments of the present invention, an administrator can physically set-up one network-enabled device in a traditional manner, for example, using the device's local web page, physically via the device's front panel or by specific software if the device is headless. Then, the remaining network-enabled devices may be configured and/or updated by obtaining the configuration parameters from the traditionally configured device in a viral-like manner throughout the network. It will be understood that effective and practical use of configuration methods discussed herein may require appropriate password/accessibility/security and the like. This level of security may be provided by, for example, established protocols, such as Remote Authentication Dial In User Service (RADIUS) without departing from the scope of the present invention. Devices according to embodiments of the present invention discussed herein have true peer relationships. Accordingly, any network-enabled device learning of an updated configuration can notify and transfer updated information to any other network-enabled device assuming their permissions allow such a transfer.

Management of the network-enabled devices capable of performing operations in accordance with some embodiments of the present invention can be performed either locally at the device(s) or centrally through the software using terminal 310. If the management of the devices is handled centrally using software, a mechanism may be established once and then managed, avoiding possible lagging update software time.

Using software for this function becomes acceptable. For example, specific devices can be 'frozen' at version 1.1 instead of optimally updating the latest version the system knows about. For example, consider a tree view in the software which can set these master parameters. Or, specific devices can be individually configured (or 'frozen') with a specific set of configuration parameters based upon the need for such specifics. This protocol manages the management which is much easier than managing the configuration of multiple of devices.

Figure 4:
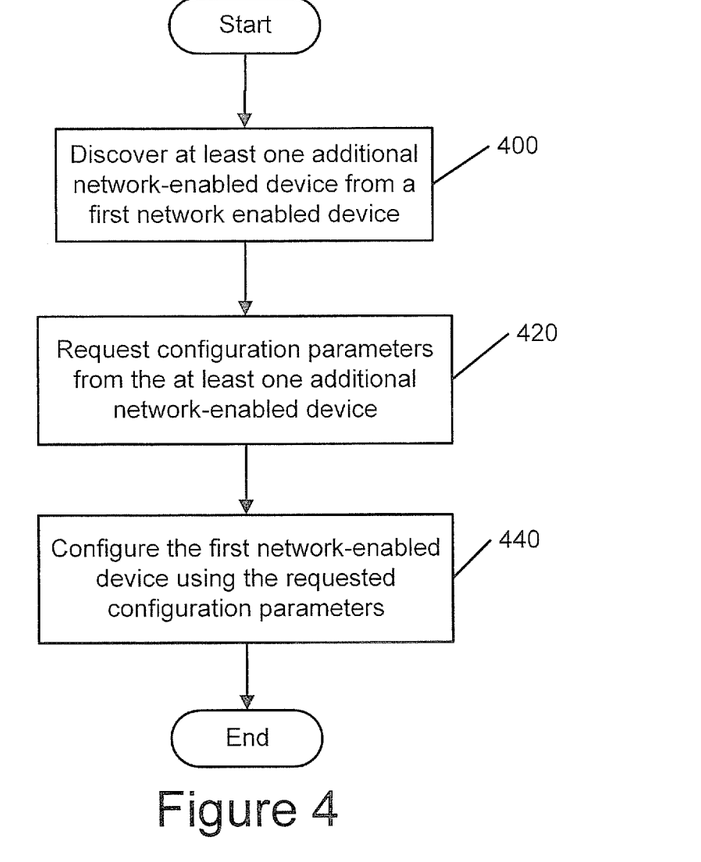
FIGS. 4 and 5 are flowcharts illustrating exemplary operations of devices according to various embodiments of the present invention.
Figure 5:
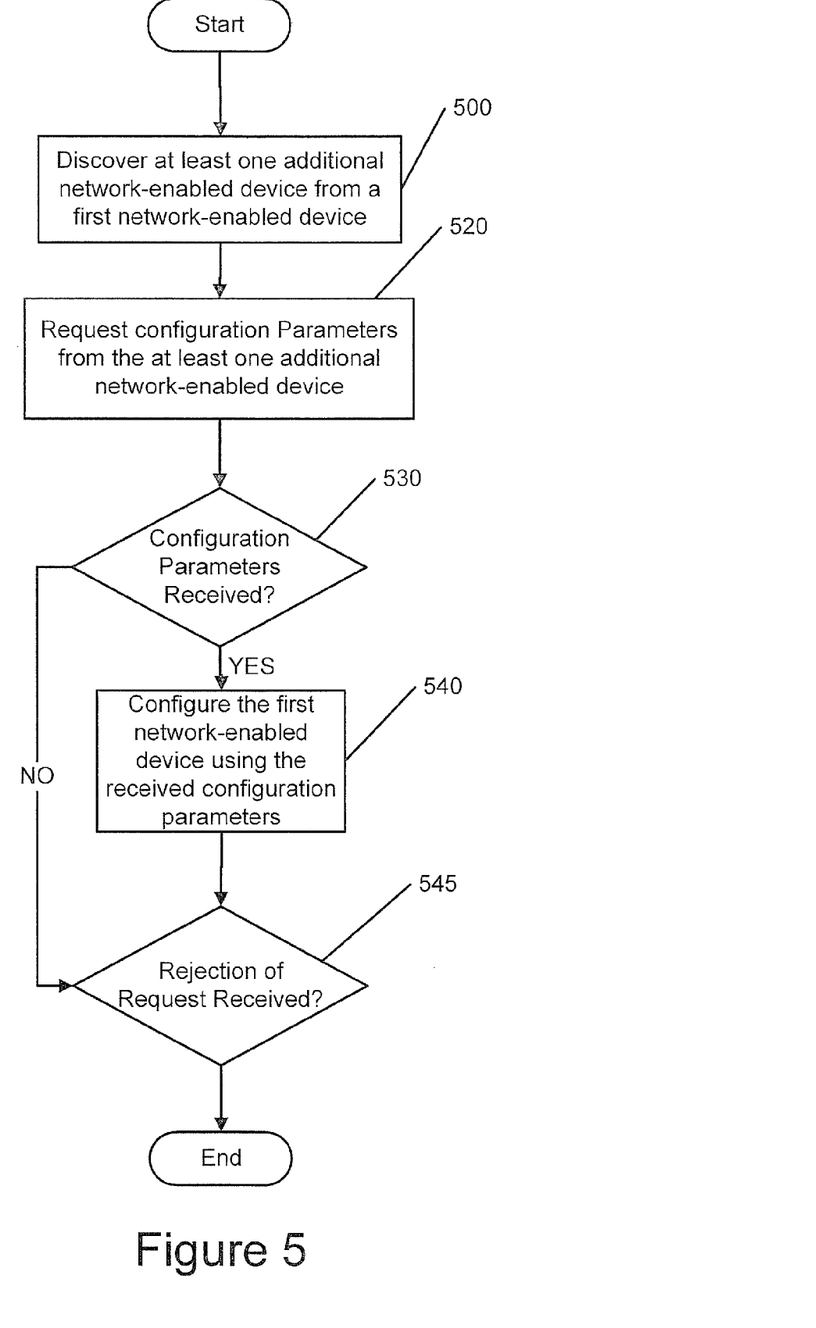

Operations for configuring network-enabled devices will now be discussed with respect to FIGS. 4 and 5. Referring first to FIG. 4, operations begin at block 400 by discovering, at a first network-enabled device, at least one additional network-enabled device containing configuration parameters relevant to the first network-enabled device. The relevant configuration parameters are obtained from the at least one additional network-enabled device (block 420) and the first network-enabled device is configured using the obtained configuration parameters (block 440). In some embodiments of the present invention, the first network-enabled device and the at least one additional network-enabled device are peer devices.

Referring now to FIG. 6, operations begins at block 500 by discovering, at a first network-enabled device, at least one additional network-enabled device containing configuration parameters relevant to the first network-enabled device. The relevant configuration parameters are requested from the at least one additional network-enabled device (block 520). It is determined if the configuration parameters have been received from at least one network-enabled device (block 530). If the requested configuration parameters are received (block 530), the first network-enabled device is configured and/or updated using the received configuration parameters. In some embodiments of the present invention, the requested configuration parameters are received as an extended Markup Language (XML) formatted file including the relevant configuration parameters.

If, on the other hand, the configuration parameters are not received (block 530), it is determined if a rejection of the request for configuration parameters was received at the first network-enabled device from at least one of the at least one additional network-enabled device (block 545). If the rejection was received (block 545), the first network-enabled device waits to receive configuration parameters from another device.

As discussed briefly above with respect to FIGS. 1 through 5, according to some embodiments of the present invention, network-enabled devices may discover other devices on the network and obtain relevant configuration parameters therefrom. The obtained relevant configuration parameters may be used to configure the network-enabled device. Thus, some embodiments of the present invention may simplify the configuration of network-enabled devices as discussed herein.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A method for configuring network-enabled devices, the method comprising:
    discovering, at a first network-enabled device, at least one additional network-enabled device containing configuration parameters including details of how to configure the first network-enabled device, the first network-enabled device comprising an uninterruptible power supply (UPS), an electricity meter, or a feeder protector;
    obtaining the configuration parameters from the at least one additional network-enabled device;
    configuring the first network-enabled device using the obtained configuration parameters; and
    after configuring the first network-enabled device, providing the configuration parameters from the first network-enabled device to a third network-enabled device to configure the third network-enabled device,
    wherein obtaining the configuration parameters from the at least one additional network-enabled device and providing the configuration parameters from the first network-enabled device to the third network-enabled device comprise virally obtaining and providing the configuration parameters.

2. The method of claim 1, wherein obtaining comprises:
    requesting the configuration parameters from the at least one additional network-enabled device; and
    receiving the requested configuration parameters at the first network device.

3. The method of claim 2, wherein receiving the requested configuration parameters comprises receiving the requested configuration parameters as an extended Markup Language (XML) formatted file including the configuration parameters.

4. The method of claim 2, wherein requesting the configuration parameters is followed by receiving a rejection of the request for configuration parameters at the first network-enabled device from at least one of the at least one additional network-enabled device.

5. The method of claim 1, wherein the first network-enabled device and the at least one additional network-enabled device are peer devices.

6. The method of claim 1, wherein configuring the first network-enabled device further comprises updating the configuration parameters at the first network-enabled device based on the configuration parameters obtained from the at least one additional network-enabled device.

7. The method of claim 1, wherein the first network-enabled device comprises a newly added network-enabled device and the at least one additional network-enabled device comprises at least one existing network-enabled device.

8. The method of claim 1, wherein the first network-enabled device comprises an existing network-enabled device and the at least one additional network-enabled device comprises at least one newly added network-enabled device.

9. The method of claim 1, wherein the first network-enabled device has a first type, and wherein the at least one additional network-enabled device has a second type, different from the first type.

10. The method of claim 1, wherein the network-enabled device has a first type, and wherein the at least one additional network-enabled device has a second type, different from the first type.

11. A network-enabled device comprising:
    a discovery module positioned in the network-enabled device and configured to discover at least one additional network-enabled device containing configuration parameters including details of how to configure the network-enabled device, the network-enabled device comprising an uninterruptible power supply (UPS), an electricity meter, or a feeder protector;
    a communication module positioned in the network-enabled device and configured to virally: obtain the configuration parameters from the at least one additional network-enabled device, and provide the configuration parameters from the network-enabled device to a third network-enabled device to configure the third network-enabled device after configuring the network-enabled device;
    a configuration module positioned in the network enabled device and configured to configure the network-enabled device using the obtained configuration parameters; and
    a processor configured to communicate with the discovery module, the communication module, and the configuration module.

12. The network-enabled device of claim 11, wherein the communication module is configured to request the configuration parameters from the at least one additional network-enabled device and receive the requested configuration parameters at the network-enabled device.

13. The network-enabled device of claim 12, wherein the communication module is configured to receive the configuration parameters as an extended Markup Language (XML) formatted file including the configuration parameters.

14. The network-enabled device of claim 11, wherein the first network- enabled device and the at least one additional network-enabled device are peer devices.

15. The network-enabled device of claim 11, wherein the configuration module is further configured to update the configuration parameters at the network-enabled device based on configuration parameters obtained from the at least one additional network-enabled device.

16. The network-enabled device of claim 11, wherein the first network-enabled device comprises a newly added network-enabled device and the at least one additional network-enabled device comprises at least one existing network-enabled device.

17. The network-enabled device of claim 11, wherein the first network-enabled device comprises an existing network-enabled device and the at least one additional network-enabled device comprises at least one newly added network-enabled device.

18. A computer program product for configuring network-enabled devices, the computer program product comprising:
a non-transitory computer readable storage medium having computer readable program code embodied in said medium, the computer readable program code comprising:
computer readable program code configured to discover, at a first network-enabled device, at least one additional network-enabled device containing configuration parameters including details of how to configure the first network-enabled device, the first network-enabled device comprising an uninterruptible power supply (UPS), an electricity meter, or a feeder protector;
computer readable program code configured to obtain the configuration parameters from the at least one additional network-enabled device;
computer readable program code configured to configure the first network-enabled device using the obtained configuration parameters; and
computer readable program code configured to, after configuring the first network-enabled device, provide the configuration parameters from the first network-enabled device to a third network-enabled device to configure the third network-enabled device,
wherein the computer readable program code configured to obtain the configuration parameters from the at least one additional network-enabled device and provide the configuration parameters from the first network-enabled device to the third network-enabled device comprises computer readable program code configured to virally obtain and provide the configuration parameters.

19. The computer program product of claim 18, wherein the computer readable program code configured to obtain comprises:
computer readable program code configured to request the configuration parameters from the at least one additional network-enabled device; and
computer readable program code configured to receive the requested configuration parameters at the first network device.

20. The computer program product of claim 19, wherein computer readable program code configured to receive further comprises computer readable program code configured to receive the requested configuration parameters as an extended Markup Language (XML) formatted file including the configuration parameters.

21. The computer program product of claim 18, wherein the first network-enabled device and the at least one additional network-enabled device are peer devices.

22. The computer program product of claim 18, wherein the computer readable program code configured to configure the first network-enabled device further comprises computer readable program code configured to update the configuration parameters at the first network-enabled device based on the configuration parameters obtained from the at least one additional network-enabled device.

23. The computer program product of claim 18, wherein the first network-enabled device comprises a newly added network-enabled device and the at least one additional network-enabled device comprises at least one existing network-enabled device.

24. The computer program product of claim 18, wherein the first network-enabled device comprises an existing network-enabled device and the at least one additional network-enabled device comprises at least one newly added network-enabled device.

25. The computer program product of claim 18, wherein the first network-enabled device has a first type, and wherein the at least one additional network-enabled device has a second type, different from the first type.

* * * * *